United States Patent [19]

Sengel

[11] Patent Number: 5,690,185
[45] Date of Patent: Nov. 25, 1997

[54] SELF POWERED VARIABLE DIRECTION WHEELED TASK CHAIR

[75] Inventor: Michael P. Sengel, 110 S. Lorraine Rd., Wheaton, Ill. 60187-5833

[73] Assignee: Michael P. Sengel, Wheaton, Ill.

[21] Appl. No.: 410,685

[22] Filed: Mar. 27, 1995

[51] Int. Cl.⁶ ..................................................... B60K 1/02
[52] U.S. Cl. ........................ 180/65.1; 180/65.5; 180/907; 280/304.1
[58] Field of Search ........................... 180/65.1, 65.5, 180/65.6, 65.8, 907, 214, 15, 21, 24.01, 24.07, 224, 255; 280/647, 648, 650, 250, 250.1, 304.1

[56] References Cited

U.S. PATENT DOCUMENTS

| | | | |
|---|---|---|---|
| 1,839,981 | 1/1932 | Markey | 180/255 |
| 2,362,616 | 11/1944 | Cloud | 180/65.1 |
| 3,111,181 | 11/1963 | Yatich | 180/65.1 |
| 3,534,825 | 10/1970 | Reffle | 180/252 |
| 4,461,367 | 7/1984 | Eichinger et al. | 180/65.1 |
| 4,613,151 | 9/1986 | Kielczewski | 280/650 |
| 5,090,513 | 2/1992 | Bussinger | 180/907 |
| 5,183,133 | 2/1993 | Roy | 180/252 |
| 5,249,636 | 10/1993 | Kruse | 180/21 |
| 5,275,248 | 1/1994 | Finch | 180/65.6 |
| 5,322,140 | 6/1994 | Bussinger | 180/65.1 |
| 5,366,036 | 11/1994 | Perry | 180/65.1 |
| 5,369,324 | 11/1994 | Saether | 310/49 R |
| 5,409,250 | 4/1995 | Csotonyi | 180/907 |
| 5,482,125 | 1/1996 | Pagett | 180/65.5 |

FOREIGN PATENT DOCUMENTS

| | | | |
|---|---|---|---|
| 0 338 689 | 10/1989 | European Pat. Off. | 180/907 |
| 43 03 342 | 8/1994 | Germany | 180/65.6 |
| 330480 | 6/1930 | United Kingdom . | |

Primary Examiner—Brian L. Johnson
Assistant Examiner—Frank Vanaman

[57] ABSTRACT

A Self Powered Variable Direction Wheeled Task Chair, and a personal mobility device, providing additional ranges of motion in that it has an electrically powered height adjustable seat allowing the operator's seating position to range from standard table height seating to work bench or counter top seating. Additionally and more importantly, the chair, will have directional movement capabilities well beyond typical wheel chairs, or other wheel driven personal mobility devices in that it will utilize electro-mechanical directionally pivoting propulsion, capable of not only forward, backward, and pivot turning capabilities, but also sideways movement or more precisely, movement in any direction, and a rotational movement as may be required by the operator.

6 Claims, 16 Drawing Sheets

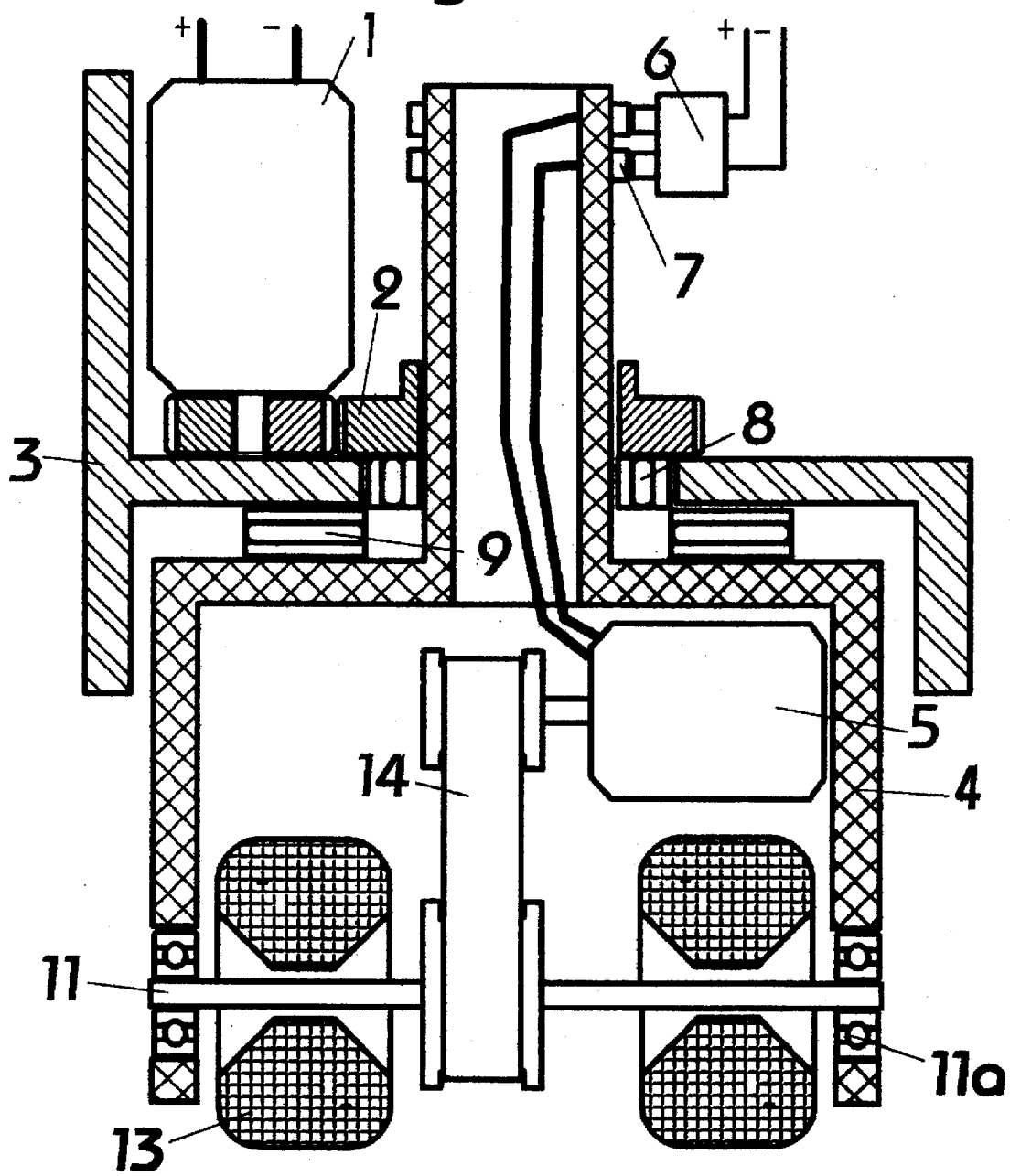

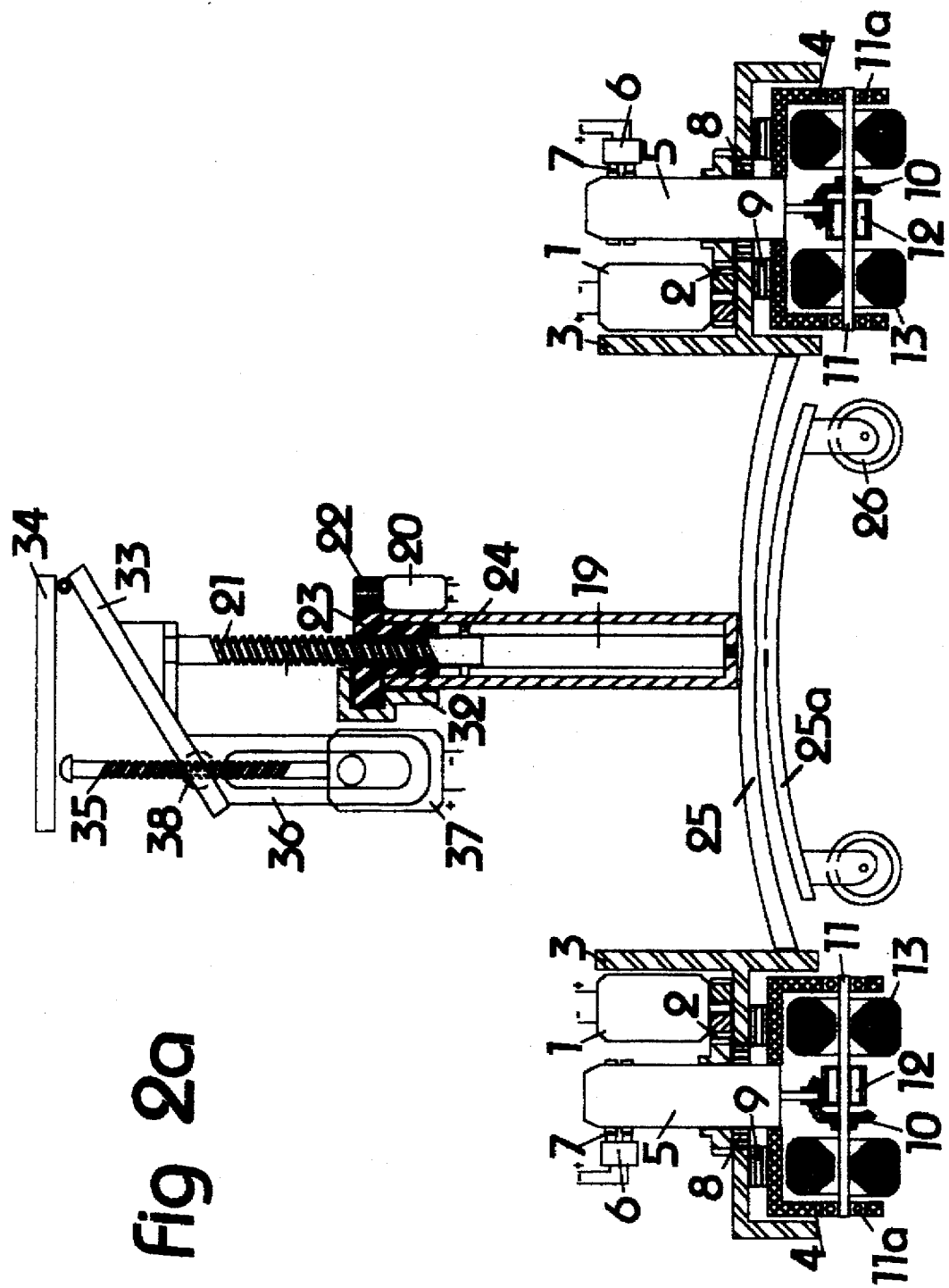

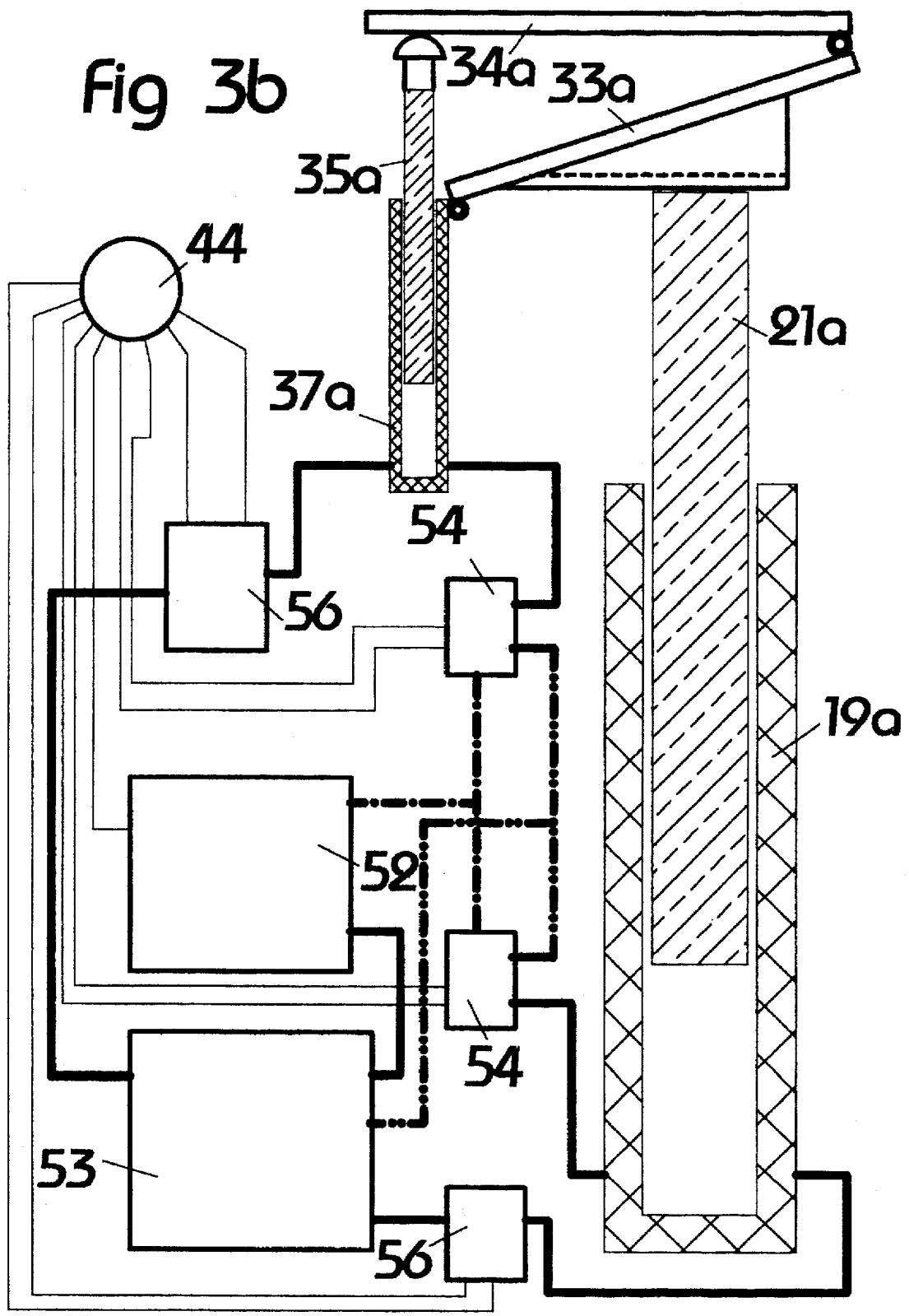

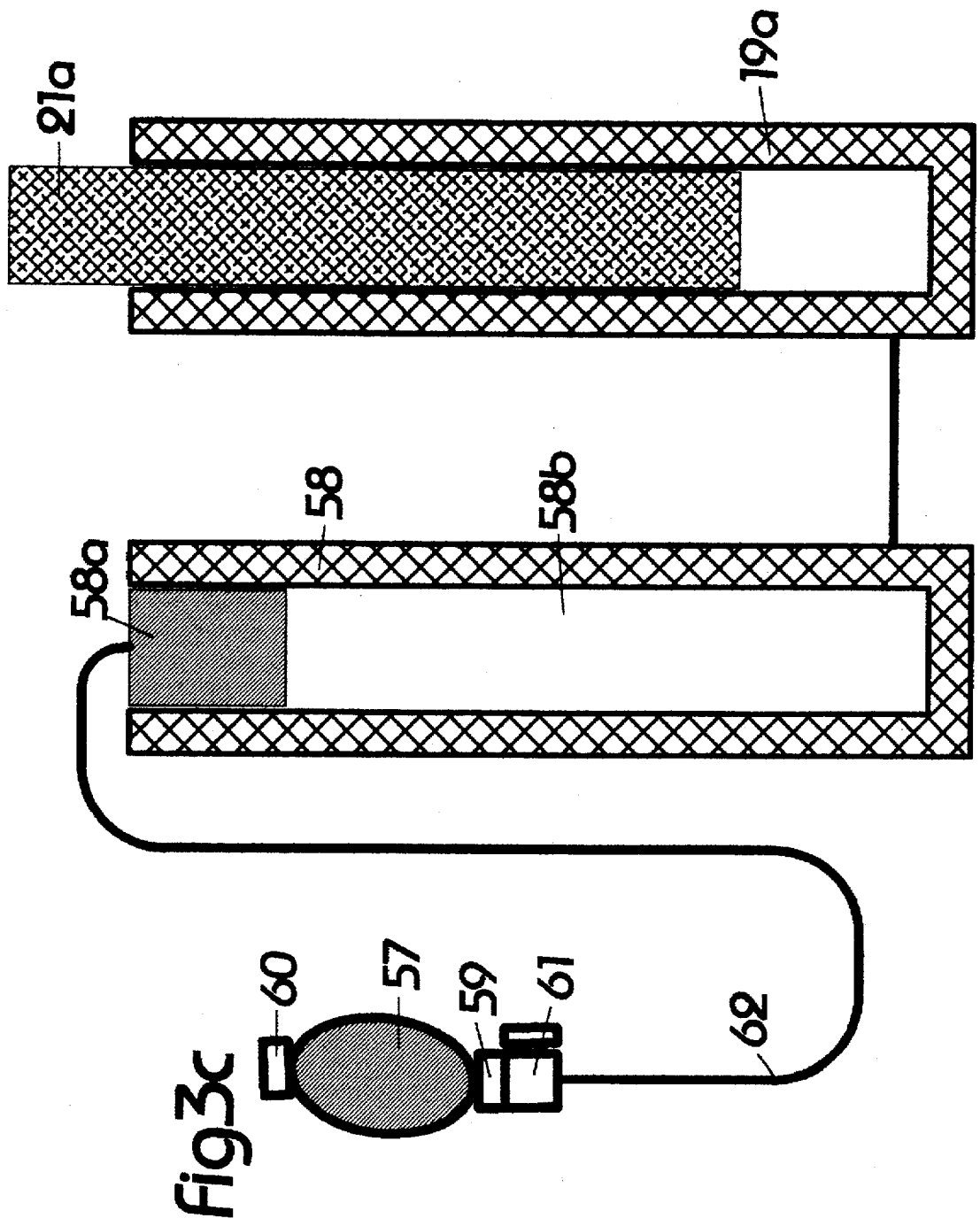

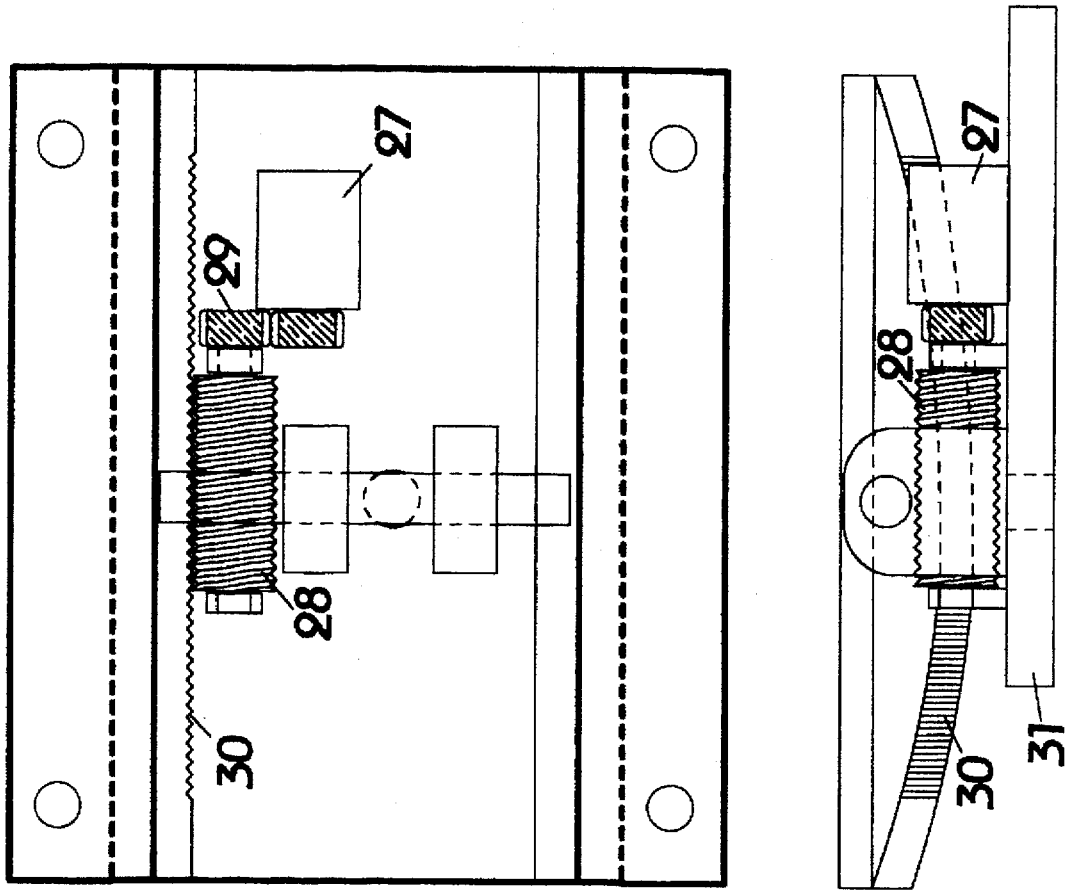

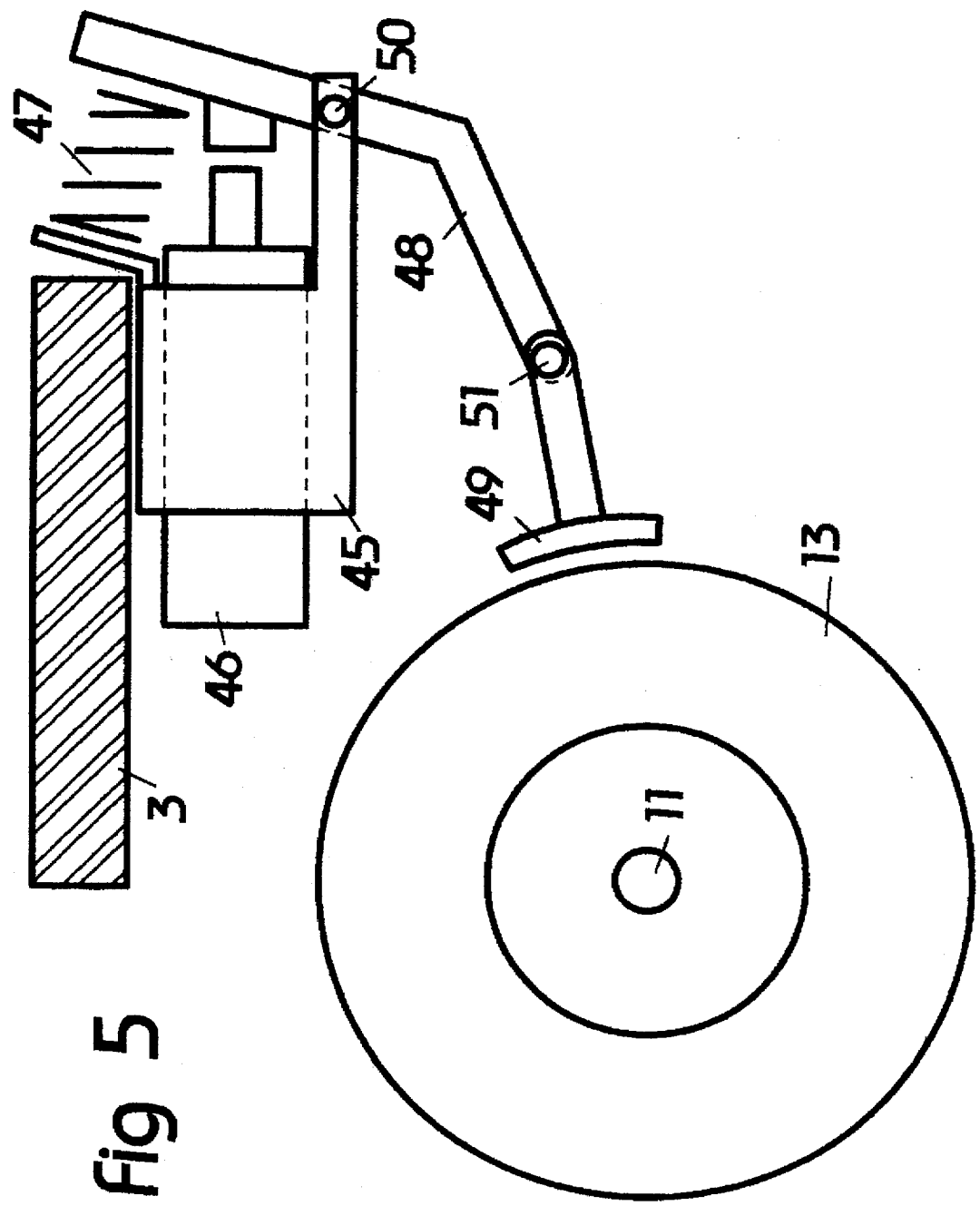

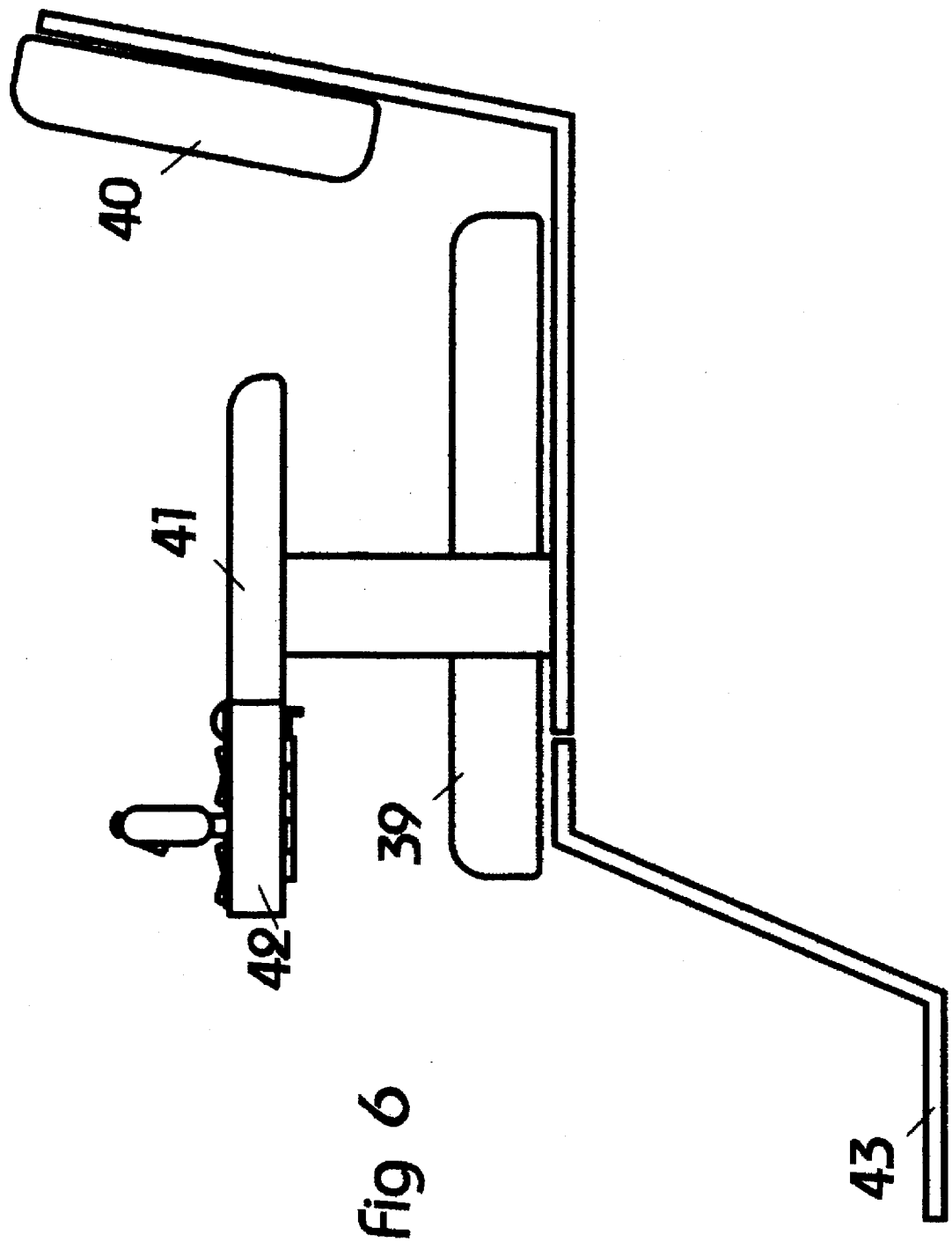

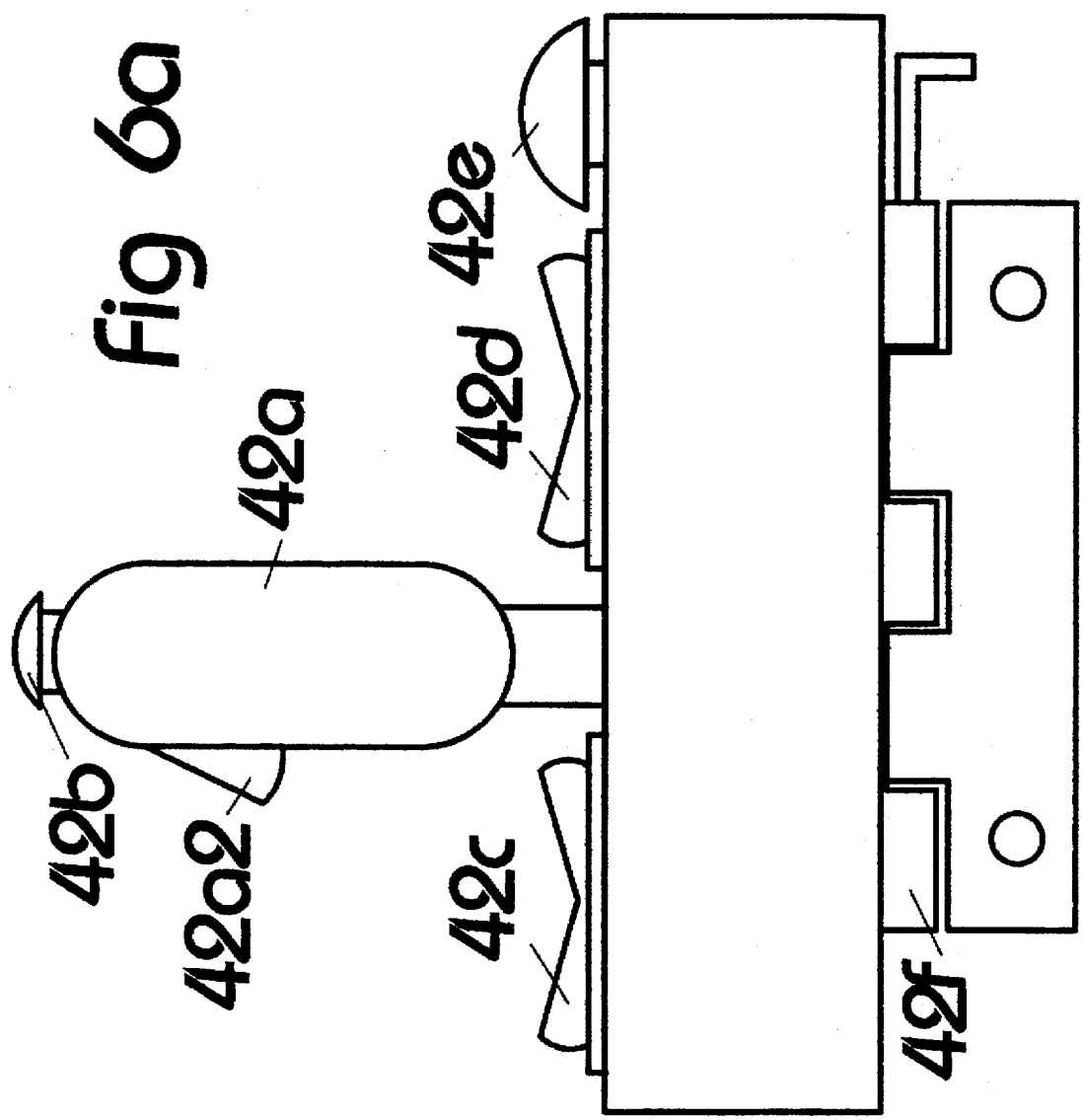

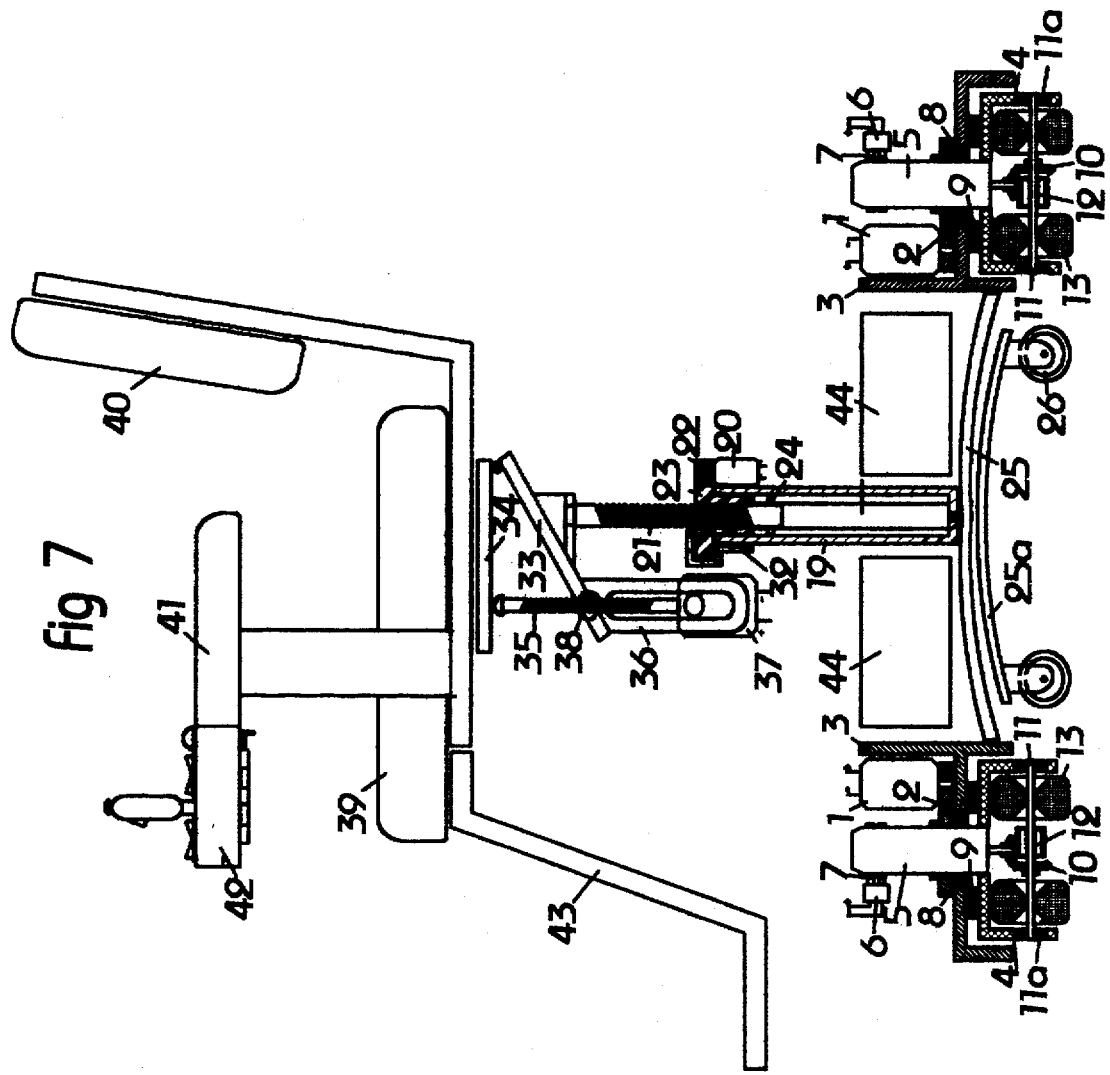

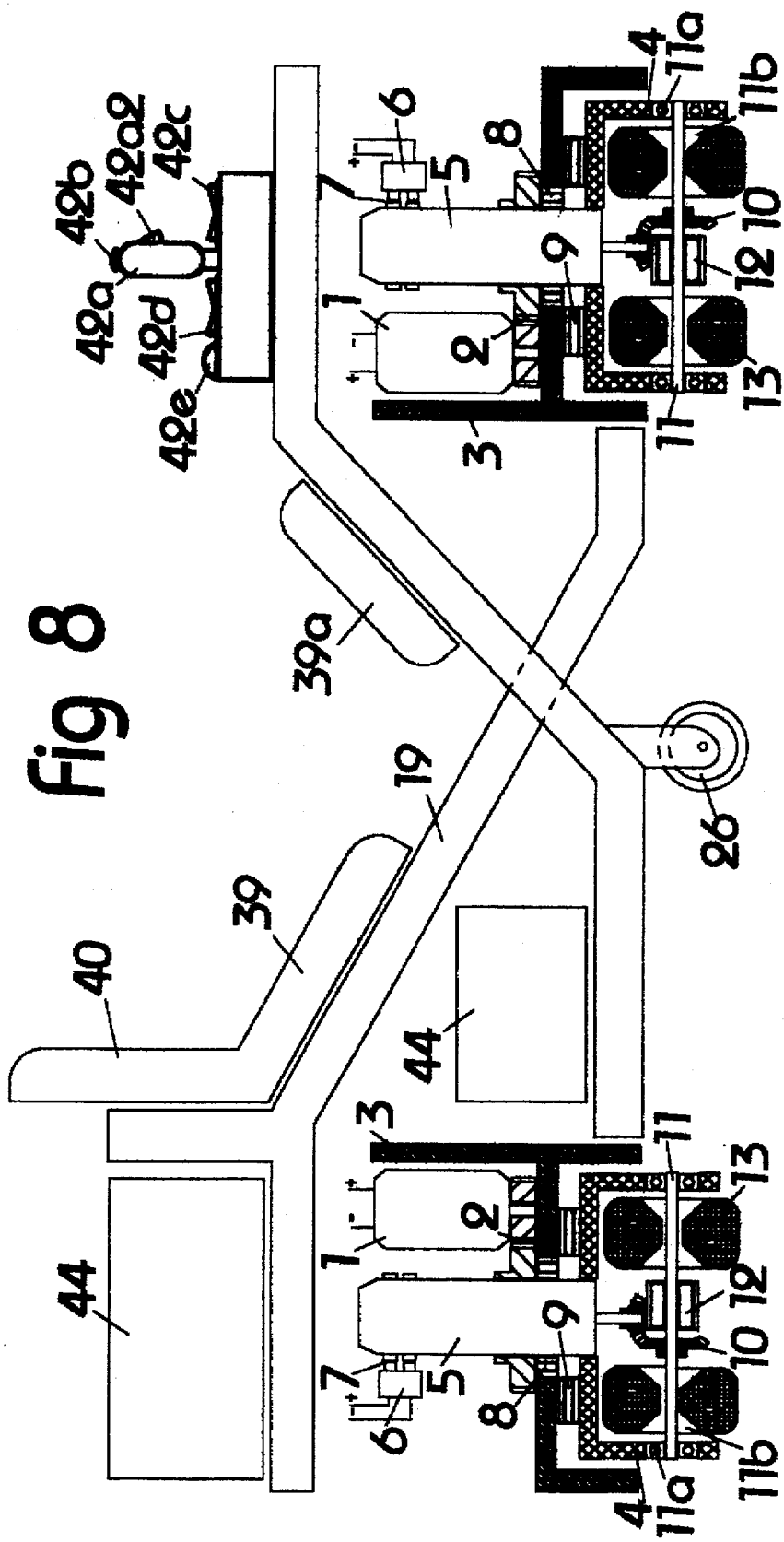

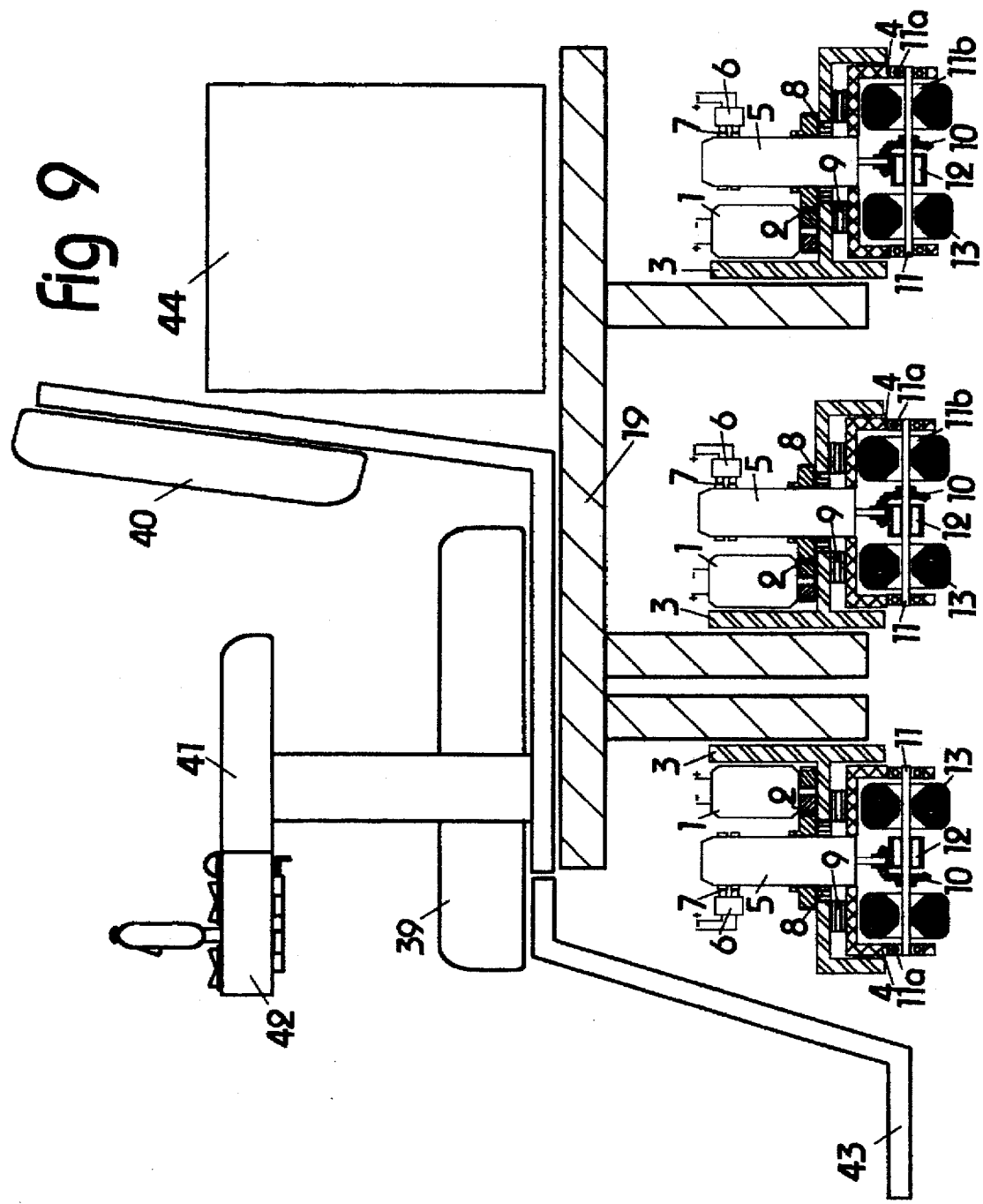

SELF POWERED VARIABLE DIRECTION WHEELED TASK CHAIR

BACKGROUND

1. Field of Invention

This invention relates to self powered wheel chairs and personal mobility devices for use in aiding individuals to move about in a greater range of mobility including sideways or any angle thereof, and allow additional capabilities provided by a programmed vertical height adjustment.

2. Description of Prior Art

All currently available self powered wheel chair/personal mobility devices typically utilize twin side mounted wheel drive means mounted in a fixed longitudinal direction with either front steering similar to a bicycle, or limit propulsion of one of the drive means to accomplish a turning or pivoting movement. Exhibit A, B, C, and D.

This steering makes movement of the vehicle somewhat restrictive in that only forward, backward, or a pivoting movement is available. In order to move to a different position in a lateral proximity, the operator must back up, pivot, move forward, pivot, and move forward again. This structured movement is fine for applications such as going down a sidewalk or where distance of travel is less a concern than actual mobility. However, the environment the chair operates in can also raise concerns about its lack of maneuverability. In a confined office or work setting, the constant backing and pivoting becomes time consuming and movement restraining. Additionally, in a confined work station with limited maneuvering space, more time is spent on changing locations than on productivity. This is acknowledged by the necessity of law. Specifically, the enactment of the 1990 Americans with Disabilities Act. The below examples are taken from the Accessibility Guidelines, revised Aug. 19, 1991. Their requirement for a 180 degree turn as indicated, require(s) the five foot minimum turning radius, p 14 where they stress that this is very important.

Additionally, these devices typically have only a manual seat height adjustment capable of only a few inches of movement. Furthermore, in some cases, the operator must exit the seat to accomplish adjustment. Again a concern with standard wheel chairs is expressed by referring to the Americans with Disabilities Act. Their guidelines state that work surface heights will be accessible if their height ranges between 28" and 34" above the finished floor, p 27. And that storage spaces shall be within the reach ranges of 48" to 54", p 36.

This implies that in a home of a restricted individual it is difficult to reach cabinets, work at a standard height kitchen counter or bath vanity. Furthermore, even if one could comfortably reach the kitchen counter, to move to the other end of the counter, maneuvering to get there raises another challenge.

OBJECTS AND ADVANTAGES

As the reader will see, the invention provides an electro-mechanical operator controlled seat height adjustment extending reach ranges well above the maximum 54" as required by the ADA. In a house, the invention allows the operator to sit at a table and move to a kitchen or bathroom area and raise the seat and continue to work comfortably and conveniently at standard counter tops or reach standard height storage spaces. In a work environment it allows the operator to work at a desk and move to a work bench, raise the seat and continue to work. More importantly, another advantage is that in a kitchen or work setting, the operator can move laterally in any direction including parallel to a counter top or workbench in a single motion as opposed to a typical wheel chair forward, backward, and pivot maneuvering.

Additionally, for confined area operation, a rotational movement is incorporated for turning around similar to swiveling a desk chair. Again, well within the ADA's guideline of 5'.

BRIEF DESCRIPTION OF THE DRAWING FIGURES

In the drawings closely related figures have the same number but different alphabetic suffixes.

FIGS. 1a to 1c show various styles of electro-mechanical directionally pivoting propulsion means; 1a. Stressed Motor Housing Drive Unit, 1b. Belt Drive Unit, 1c. Direct Drive Wheel Motor Drive Unit.

FIGS. 2a and 2b show various styles of frames; 2a. Frameless Style Chair, 2b. Box Frame or Tubular Frame.

FIGS. 3a to 3c show various styles of vertical height adjustment means. FIG. 3a shows an electro-mechanical version, FIG. 3b shows an electro-hydraulic version, and FIG. 3c shows a manual air over hydraulic version.

FIGS. 4a & 4b show various styles of electro-mechanical horizontal tilt adjustment means; 4a Worm Drive mechanism, 4b Screw Thread mechanism FIG. 5. Parking Brake mechanism, suitable for attachment to any style electro-mechanical directionally pivoting propulsion means.

Figure 1A:
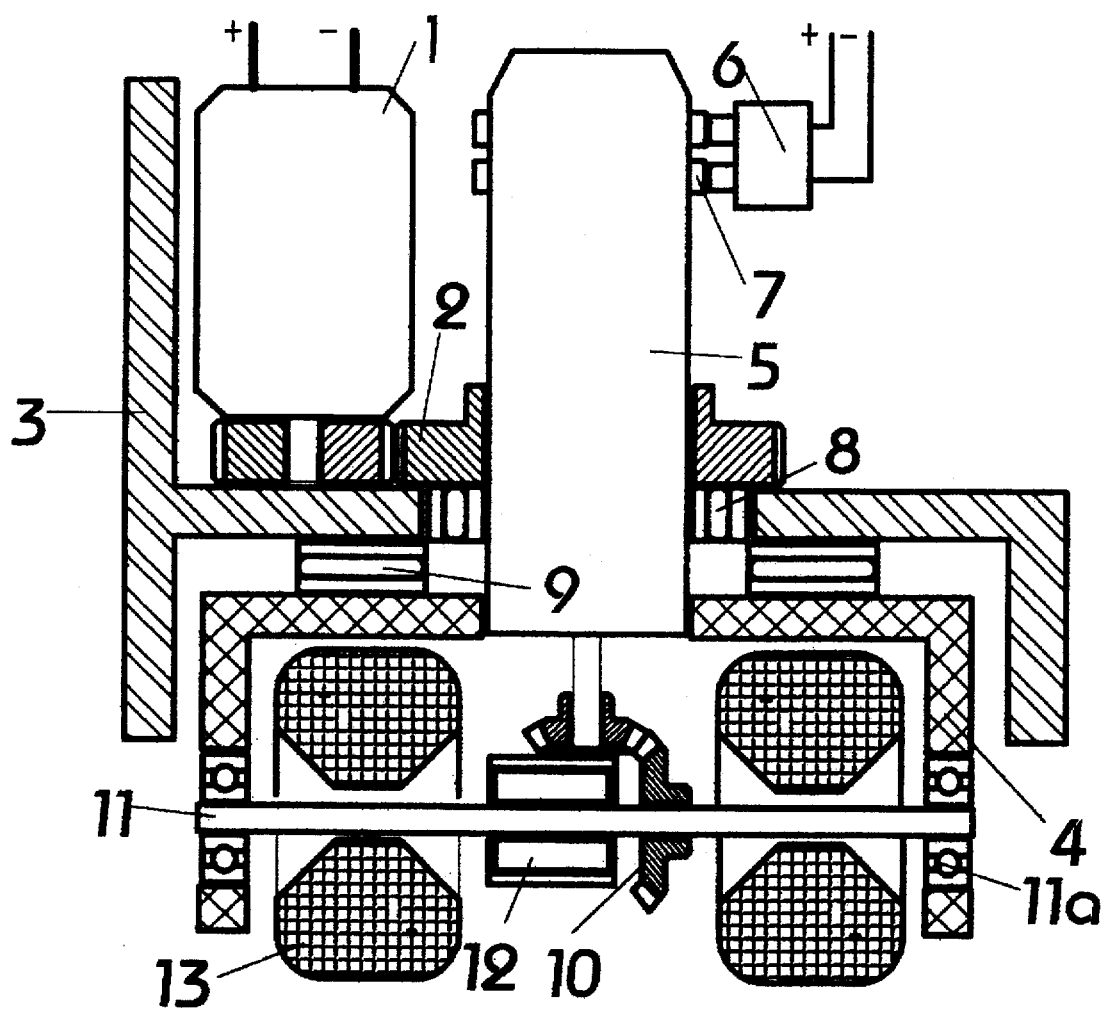

FIG. 6. Typical seating means with arm rests and foot-resting means.

FIG. 6a provides an illustration of one variation of the control panel.

FIG. 7. Complete unit combining FIG. 1a electro-mechanical directionally pivoting propulsion means, FIG. 2a frameless style chair, FIG. 3a screw post style electro-mechanical vertical height adjustment means, FIG. 4b screw thread electro-mechanical horizontal tilt adjustment means, FIG. 5 parking brake mechanism, and FIG. 6 typical seating means.

FIG. 8. Another embodiment entitled the self powered Posture Chair.

FIG. 9. Other possible placement arrangements for the electro-mechanical directionally pivoting propulsion means with comments.

| Reference Numerals in Drawings ... | | | |
|---|---|---|---|
| 1. | Motor, Directional | 2. | Gear Set, Directional |
| 3. | Frame | 4. | Frame, Pivot/Wheel Support |
| 4a. | Armature Shaft Groove | 5. | Motor, Drive |
| 5a. | Pully, Drive | 5b. | Pully Driven |
| 6. | Contact Brushes - Drive Power | | |
| 7. | Contact Rings - Drive Power | | |
| 8. | Bearings, Side | 9. | Bearings, Load |
| 10. | Gear Set, Drive | 11. | Axle |
| 11a. | Bearings, Axle | 12. | Roller Clutch |
| 13. | Drive Wheels/Traction Surface | | |
| 14. | Belt/Chain, Drive | 15. | Shaft, Armature Fixed |
| 15a. | Bearings, Load, Housing | | |
| 16. | Armature | 16a. | Rings, Snap |
| 17. | Field Magnets | 18. | Housing, Split Wheel Motor |
| 19. | Frame Member - Electro Mechanical Seat Post | | |
| 19a. | Frame Member - Electro-Hydraulic Seat Post | | |
| 20. | Motor, Vertical Adjustment | | |

-continued

| Reference Numerals in Drawings ... | | | |
|---|---|---|---|
| 21. | Screw, Vertical Adjuster | | |
| 21a. | Ram, Hydraulic Vertical Adjuster | | |
| 22. | Drive Gear, Vertical Seat Adjuster | | |
| 23. | Driven Gear, Vertical Seat Adjuster | | |
| 24. | Pin, Anti-turn | 25. | Frame, Leaf Spring |
| 26. | Stabilizer, Side | | |
| 27. | Motor, Horizontal Tilt, Incliner/Recliner | | |
| 28. | Gear, Worm, Seat Horizontal Tilt | | |
| 29. | Gear, Transfer Driven, Seat Horizontal Tilt | | |
| 30. | Frame, Pivot, Seat Horizontal Tilt | | |
| 31. | Frame, Seat Mount | 32. | Retainer, Driven Gear |
| 33. | Bracket, Mounting, Horizontal Tilt | | |
| 33a. | Bracket, Mounting, Horizontal Tilt | | |
| 34. | Bracket, Seat Horizontal Tilt | | |
| 34a. | Bracket, Seat Horizontal Tilt | | |
| 35. | Screw, Tilt | | |
| 35a. | Ram, Electro-Hydraulic Tilt, Seat | | |
| 36. | Bracket, Motor, Tilt | | |
| 37. | Motor, Electro-Mechanical Seat Tilt | | |
| 37a. | Cyclinder, Electro-Hydraulic Seat Tilt | | |
| 38. | Nut, Pivot | 39. | Seat |
| 40. | Backrest | 41. | Armrests |
| 42. | panel, Control | 42a. | Control Joy Stick |
| 42b. | Mode Select Button | 42c. | Power Select Button |
| 42d. | Vertical Height Button | | |
| 42e. | Park/Emergency Stop Button | | |
| 42f. | Pivot Hinge | 43. | Footrests |
| 44. | Boxes, Batteries/Electrical | | |
| 45. | Bracket, Solenoid Mounting | | |
| 46. | Soleniod | 47. | Spring, Parking/Stop |
| 48. | Lever, Parking/Stop | | |
| 49. | Friction Material, Parking/Stop | | |
| 50. | Pin, Parking Lever Pivot | | |
| 51. | Pin, Friction Material Attachment | | |
| 52. | Pump, Hydraulic | 53. | Hydraulic |
| 54. | Valve, Pressure | 55. | Overflow-Piping Hydraulic |
| 56. | Valve, Return | 57. | Squeeze Bulb |
| 58. | Slave Cylinder | 58a. | Air Chamber |
| 58b. | Hydraulic Chamber | 49. | Check Valve |
| 60. | Check Valve | 61. | Relief Valve |
| 62. | Air Hose | | |

DETAILED DESCRIPTION—FIGURES, PRIMARY EMBODIMENT

A typical embodiment of the invention is illustrated in FIG. 7. The uniqueness of the invention is in the combined packaging of the technology. The electrical components are of typical commercially available design, and will be housed like the control electronics in plastic boxes (44), FIG. 7. These items can be positioned in a variety of areas upon or around the frame of the chair. A typical placement is depicted in FIG. 7. This embodiment seems to be the most cost effective while retaining all of the primary functions of a complete unit. Other embodiments are possible by combining other aspects of the various components and will be discussed in the conclusion and as depicted in FIGS. 2b, 3b, 3c, 4a, 8, and 9. Primary to the invention however, are the sub-components that combine together to complete the electro-mechanical directionally pivoting propulsion means FIG. 1a.

Starting at item (3) is the fixed portion of the frame member as depicted in FIG. 1a. It is a multifunctional component, in that along with the function of frame attachment, the frame item (3) provides mounting for; the directional motor item (1), the contact brush set item (6), and has the recess that carries the side load bearings item (8). The stressed drive motor housing item (5) acts as the pivot shaft in that it is in contact with and rotates inside of the side load bearings and supports the side load of the remaining assembly. The stressed drive motor housing also carries the contact rings item (7), which are in spring loaded contact with brushes from the contact set with brush holders item (6). The directional motor item (1) has attached a drive gear in contact with a driven gear, which combined, complete the directional gear set, item (2). The driven gear of this set is attached to the stressed drive motor housing item (5) which then extends downward through the side bearings as depicted in FIG. 1a and connects to the pivot frame item (4). Extending down from the drive motor is a drive gear which contacts the driven gear of the drive gear set item (10) which is fixed to the axle item (11) which is supported by the pivot frame item (4). Between the fixed frame member item (3) and the pivot frame item (4), is a load bearing item (9) providing support and completing the pivot capability. The pivot frame item (4) then extends outward from the load bearings item (9) and down to meet the axle item (11),and the driven gear of the drive gear set item (10). Additionally on fixed on the axle item (11), is a one way roller clutch item (12) which allows the drive wheels to turn in opposite directions during pivoting which reduces frictional drag during this operation. As depicted in FIGS. 1a, wheel bearings item (11a), drive wheels item (13), are also carried by the axle item (11) and combine to complete the electro-mechanical directionally pivoting propulsion means. These drive wheels item (13) will be utilized to make contact with and transmit power to the ground. A parking brake assembly FIG. 5, comprising the mounting bracket item (45), the solenoid item (46), the extension springs item (47), the pivot lever item (48) and the friction material item (49), is capable of mounting to any of the electro-mechanical directionally pivoting propulsion means frame item (4) in FIGS. 1a, 1b, or 1c. Power for propulsion drive motor comes from the control circuits to the contact set brush holders item (6). Power for the directional motor is direct from the control circuits.

The electro-mechanical directionally pivoting propulsion means as just described and depicted in FIGS. 1a is connected to the outer ends of the longitudinal leaf spring frame member item (25), in FIG. 2a & 7. The chair as depicted requires 2 electro-mechanical directionally pivoting propulsion means mounted one on the front of the longitudinal spring frame member item (25) and one at the rear. The 2 diagonal leaf springs have a stabilizer element item (26) attached to the outer ends and all 3 leaf springs, the longitudinal spring carrying the 2 electro-mechanical directionally pivoting propulsion means and the 2 diagonal springs carrying 4 stabilization elements item (26) intersect at their mid point and attach to the bottom of the stressed seat post frame member item (19) in FIGS. 2a, 3a, and 7.

Figure 3A:
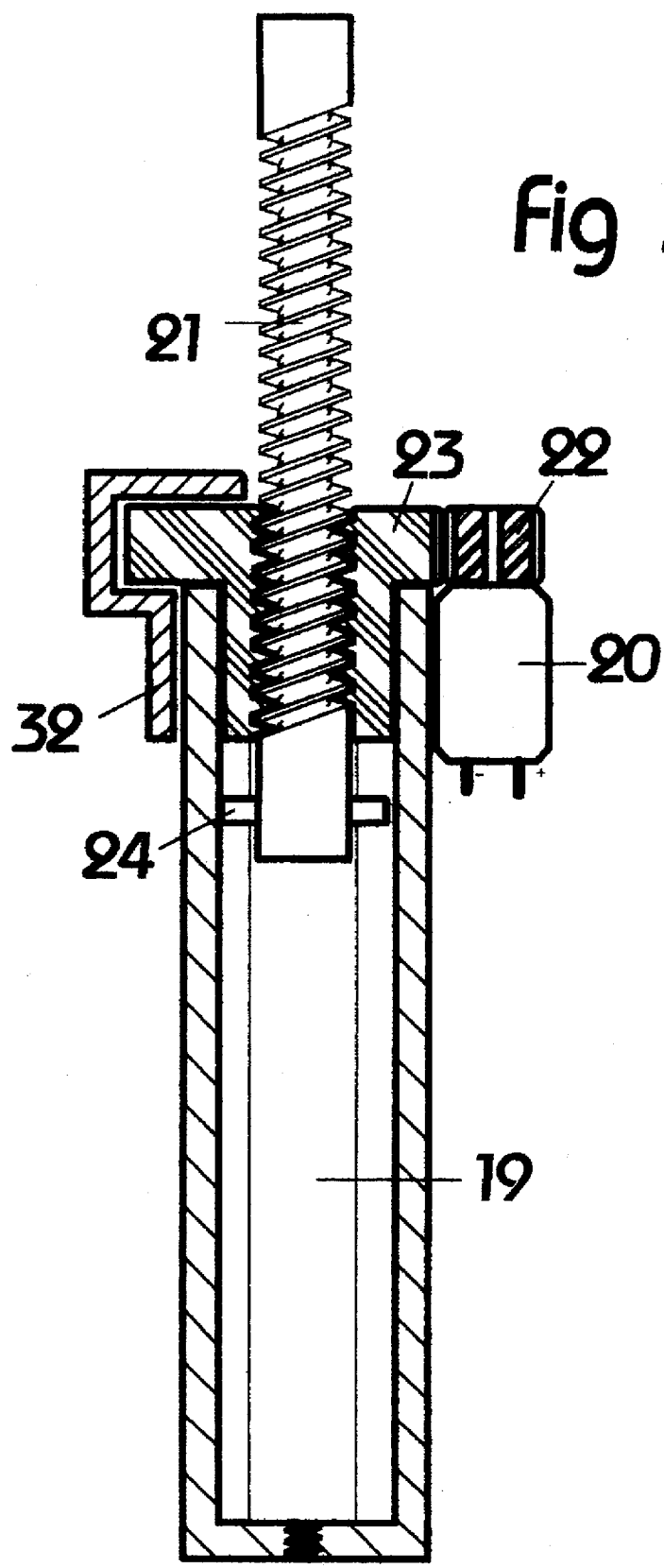

Rising from the center connection point of the leaf springs item (25), is the assembly that comprises the electro-mechanical vertical height adjustment means as depicted in FIG. 3a. Central to this assembly is the stressed seat post frame member item (19) which carries the vertical drive motor item (20), the driven gear item (23), the driven gear retainer item (32) and the seat vertical adjuster screw item (21) and its anti-turn pin item (24).

Figure 4B:
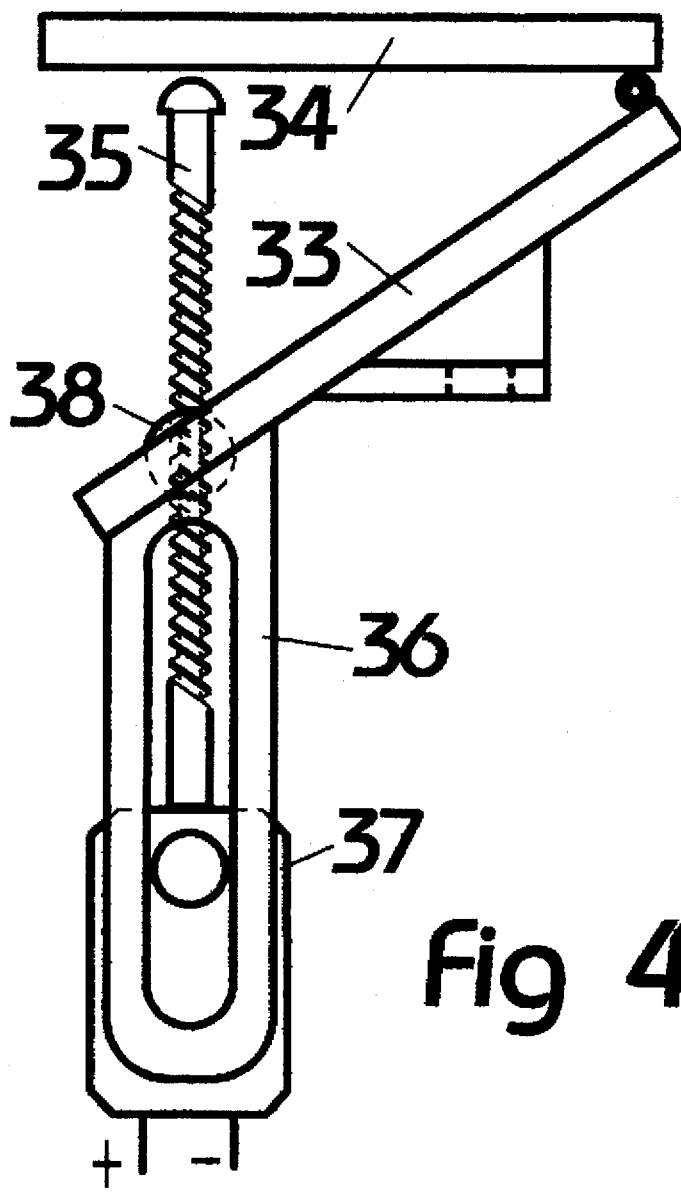

Above the electro-mechanical vertical height adjustment means and attached to it, is a horizontal tilt adjustment means. Comprising the electro-mechanical horizontal tilt adjustment means FIG. 4b are the mounting bracket item (33), the tilt bracket item (34), the tilt screw item (35), the tilt motor bracket item <36) and the tilt motor item (37). The tilt screw item (35) passes through the pivot nut item (38) mounted in the mounting bracket item (33), with the screw's ball end riding in the recess of the tilt bracket item (34).

Mounted to the electro-mechanical horizontal tilt adjustment means FIG. 4b, is the seating means comprising the seat bottom item (39), the backrest item (40), the arm rests item (41), the control panel item (42) and the footrests item (43) as depicted in FIGS. 6 and 7.

Comprising the control panel item (42) FIG. 6a, is the joy stick item (42a), the mode button item (42b), the power select switch item (42c), the vertical height button item (42d), the Park/Emergency Stop button item (42e), and the pivot hinge item (42f).

OPERATION

The Manner of using the Self Powered Variable Direction Wheeled Task Chair to move about requires the operator to either disconnect the electrical input once the on board batteries are charged or to select plugged in mode and take position in the operator seat.

From a 110 or selectable 220 volt (+/− 3%) input, power is directed to the on board electronics which provide for overnight charging of the battery packs or to a power converter directs power in appropriately reduced form to the control and power circuits if plugged in operation is selected. A user selectable power switch item (42c) is for choosing between plugged in operation and free movement. If selected, plugged in operation is limited only by the length of the power cord. Control of the chair is directed by the user control panel item (42), mounted on either the left or right arm rest. After selecting plugged in mode or free travel mode the operator next selects the preferred driving mode.

With the mode button item (42b) in the position for normal pivot drive mode, the rear electro-mechanical directionally pivoting propulsion means will receive power from the control circuits for propulsion only and receive a fixed longitudinal direction signal from the directional control electronics. At the same time, the front electro-mechanical directionally pivoting propulsion means will receive both a power signal and a directional signal from the control panel joy stick item (42a). The front electro-mechanical directionally pivoting propulsion means will pivot on its vertical axis and receive power as determined by the operator, causing the chair to pivot about the rear electro-mechanical directionally pivoting propulsion means pivot axis in a more common steering manner for pivoting or turning corners.

Additionally, in this mode of travel, the circuitry for the electro-mechanical horizontal tilt adjustment means FIG. 4b, is active, allowing the seat to either tilt rearward when going down a ramp or tilt forward when going up a ramp. This motion once detected by a pendulum switch contained within the control electronics, will after a predetermined delay, direct the tilt motor item (37) to turn the tilt screw item (35) in the appropriate direction, raising or lowering the tilt bracket item (34) which includes or reclines the seat respectively.

With the mode selection button item (42b) in the center position, the 2nd mode of operation, synchronized, is engaged. The directional motors respond to their built in sensors and the joy stick control item (42a) and the electro-mechanical directionally pivoting propulsion means pivot are synchronized in both angle of drive and speed of drive allowing the chair to move in any direction the operator requires including laterally, sideways, or any angle thereof.

Another position selectable by the mode button item (42b) will enable the third mode of operation, Rotate. In this mode the electro-mechanical directionally pivoting propulsion means will automatically pivot, as controlled by the directional control motors item (1) running in opposite directions and then when power is applied to the electro-mechanical directionally pivoting propulsion means which are now pivoted in opposite directions, i.e. one to the left, one to the right, the chair will rotate about its vertical centerline, causing the chair to turn around such as a 180 degree turn or to what ever angle as measured from the front as required by the operator.

The last mode of operation, Park, as implied, mechanically locks the rear electro-mechanical directionally pivoting propulsion means and the electronics prevents power to both electro-mechanical directionally pivoting propulsion means, thus not allowing any movement of the unit except for seat height adjustment. This mode automatically activates once the joystick item (42a) is centered, off, or if the Park/Emergency stop button item (42e) is engaged. The park mechanism, FIG. 5, utilizes an electronic solenoid item (46) mounted to a bracket item (45) which is in turn mounted to the pivot frame item (4). The solenoid item (46) is switched on during travel to pull back the pivot lever item (48) which then pivots to lift the friction material item (49) off the traction surface (13) of the rear electro-mechanical directionally pivoting propulsion means. Springs, item (47), set between the lever item (48) and the pivot frame item (4), cause the lever to pivot whenever the lever is released from solenoid control such as when Park is indicated or when the emergency stop button item (42e) is activated by the operator. This arrangement was selected as a fail-safe should electrical power be lost; the chair will stop due to the release of the solenoid which causes engagement between the friction material and the traction material. Commercially available electric motors with built in electro-mechanical brakes and rotational sensors will also be utilized to assist with Park mode and rotational synchronization.

Another safety concern, the seat vertical height control circuit, is automatically disengaged during chair travel. The seat vertical height adjustment button item (42d) is energized only when the joy stick component of the control panel item (42) is in its neutral or centered off position which tells the control circuits that no travel or movement is being requested. When the seat vertical height adjustment circuit is activated, power is sent to the seat vertical height adjustment motor (20), which turns the drive gear attached to its armature, which in turn rotates the driven gear item (23) which is fixed vertically in place by its retainer item (32). The driven gear item (23) has internal threads which interact with the threads of the seat post adjuster screw item (21). An anti-turn pin (24) keeps the seat adjuster screw from turning, and because the driven gear is fixed vertically in place, the seat adjuster screw (21) is forced to move either up or down as demanded from the seat vertical height adjustment button item (42d) allowing vertical movement of the seat.

Once the joy stick item (42a) is moved from center neutral position, the seat height adjustment circuit is deactivated and the seat height will be maintained. All joy stick demands except for seat height are ignored once Park or Emergency Stop button item (42e) is activated. The emergency stop button is of push-pull design which requires the operator to pull the button out to allow chair operation once it has been activated. When the Park/Emergency Stop button item (42e) is pushed in, inadvertent bumping of the joy stick item (42a) will not cause unwanted movement of the chair. A release on the control panel hinge item (42f) allows the control panel item (42) to be pivoted out of the way should the user knowingly be at a work station for an extended time.

SUMMARY, RAMIFICATIONS, AND SCOPE

Figure 1C:
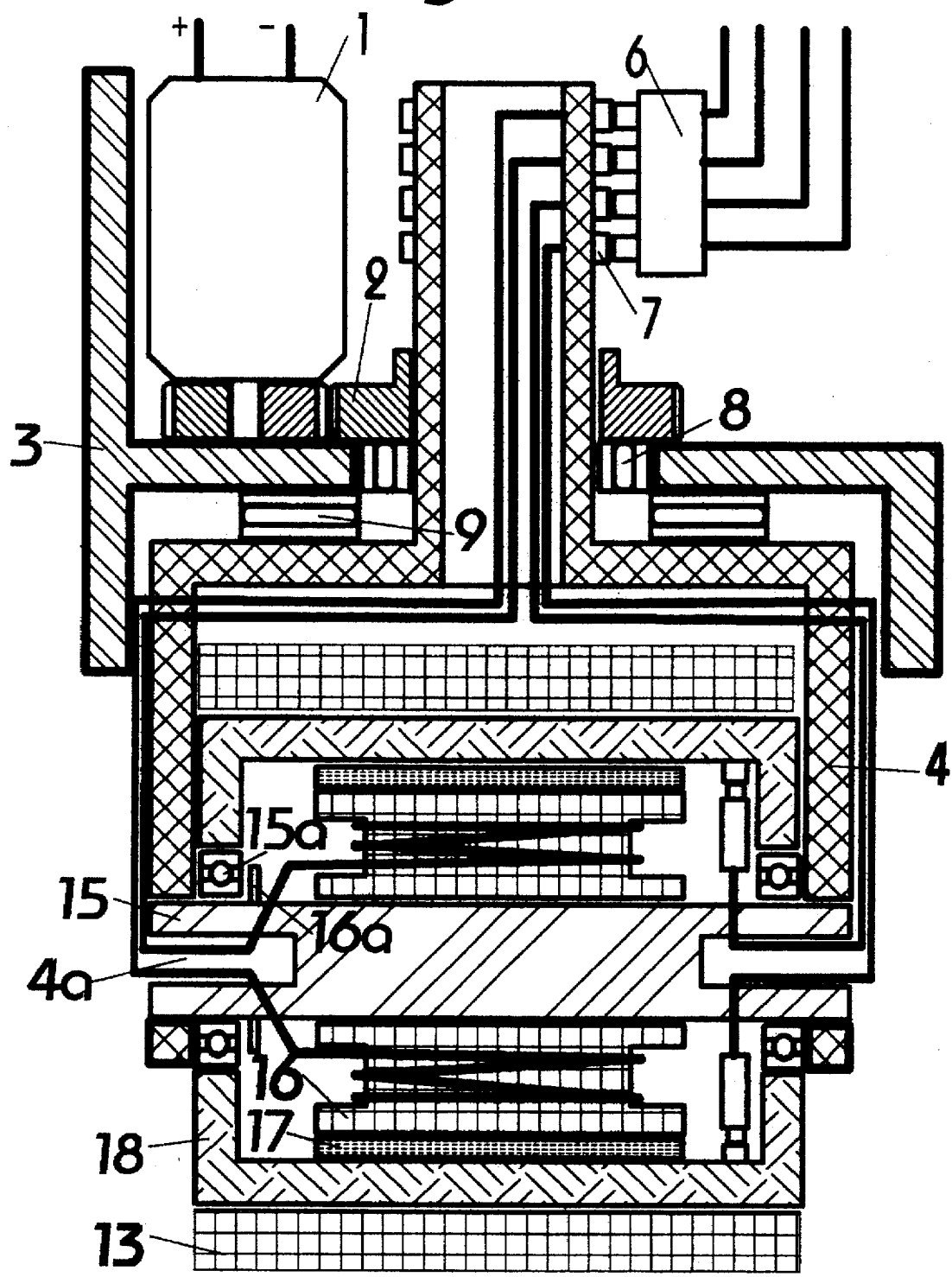

In conclusion, the Self Powered Variable Direction Wheeled Task Chair, although designed for use in a home or work environment will have numerous uses due primarily to its advantages of lateral sideways movement and automatic seat height adjustment. Several variations the basic means of sideways movement capabilities and seat raising and lowering means are possible the concept remains unique. For example, the electro-mechanical directionally pivoting propulsion means could take on the forms as depicted in FIGS. 1b and 1c, in which, means other than direct drive is utilized. In FIG. 1b a belt or chain is utilized to connect the drive motor and the axle. FIG. 1c is a unique arrangement where as the drive motor housing rotates and provides the mounting surface for the traction means. Although the methods of accomplishing pivoting propulsion are different, the function of these means is the same as that depicted in FIG. 1a.

In FIG. 1b the drive motor item (5) the drive pulley item (5a), the drive belt item (14), which could be substituted for a chain, are carried by the pivot frame (4). The driven pulley item (5b) attached to the axle item (11), and the drive wheels item (13) are supported by the pivot frame item (4). The pivot shaft is now a component of the pivot frame as opposed to FIG. 1a where the stressed drive motor housing accomplishes this function in FIG. 1a. The pivot shaft portion of the pivot frame in both FIG. 1b and 1c is drilled to allow wiring from the contact rings to pass to the electrical components mounted below the frame.

In FIG. 1c, the entire drive motor assembly is below the pivot frame. The pivot shaft portion of the pivot frame item (4), extending out and down provides the attachment point for a fixed armature shaft item (15). The armature shaft is splined to carry a separate armature item (16), which is fixed in place by snap rings item (16a). Additionally carried by the armature shaft item (15) are load bearings item (15a). These load bearings item (15a) support a split motor housing item (18). Internal of the housing and adjacent to the armature item (16) and attached to the split housing item (18) are field magnets item (17) Power would get to the armature item (16) and the field magnets item (17) by passing under the load bearings item (15a) and through a groove item (4a) cut into the armature shaft item (15) The housing item (18) capable of rotating on the load bearings item (15a) supported by the armature shaft item (15) would also carry and support a traction surface item (13). Once power was provided to the armature and field magnets the repulsive effect would cause the housing to rotate thus leading to movement of the traction surface.

Figure 2B:
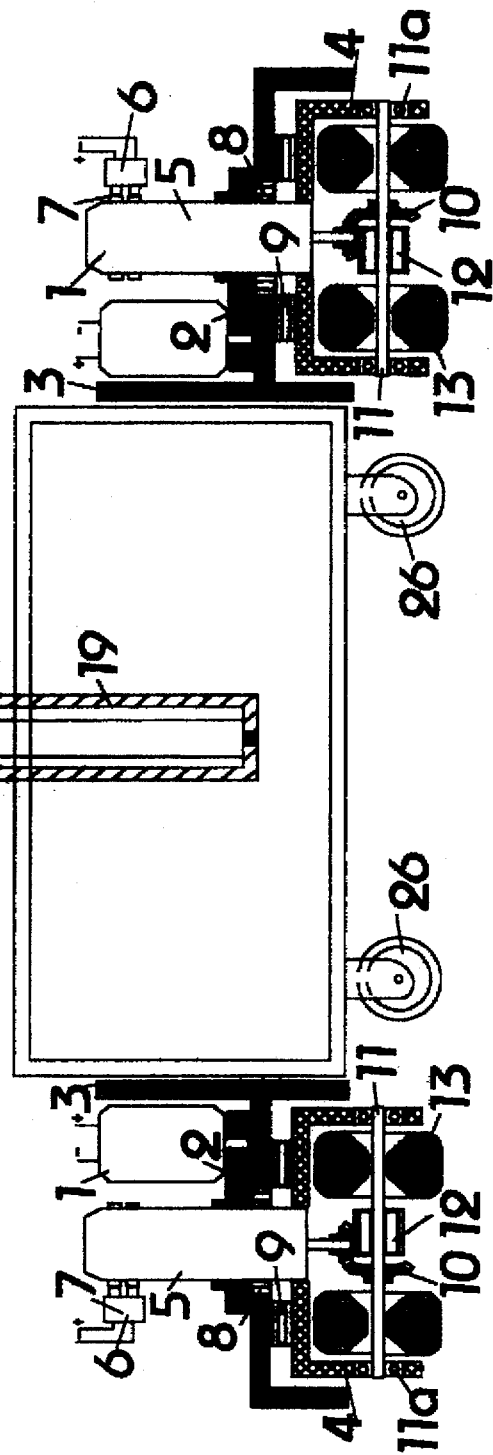

In addition to other styles of electro-mechanical directionally pivoting propulsion means, other frame styles could be utilized. Frame styles such the box style or a tubular variant as those depicted in FIG. 2b are possible.

Even the vertical seat height adjustment means have a variety of conceptual variants such as an electro-hydraulic mechanism FIG. 3b or manual-air over hydraulic variant as depicted in FIG. 3c, or a style similar to that used in floor jack or scissors jack mechanisms.

Comprising the electro-hydraulic vertical height adjustment means FIG. 3b, is the stressed seat post cylinder item (19a), the hydraulic ram which is the seat post item (21a), the hydraulic pump item (52), its reservoir item (53), pressure valves item (54), return valves item (56), and the necessary piping. Additionally in FIG. 3b is the electro-hydraulic horizontal tilt means comprising the horizontal tilt cylinder item (37a), the horizontal tilt hydraulic ram item (35a), the mounting bracket item (33a) and the tilt bracket item (34a).

FIG. 4a comprises another embodiment of the horizontal tilt mechanism which utilizes a incliner/recliner motor item (27) to drive a worm gear item (28) against a seat pivot frame item (30). When energized the motor item (27), which is mounted to the seat mount frame item (31), turns the worm gear to pivot the seat pivot frame causing the seat to tilt as directed by the pendulum switch contained with in electronic controls.

Another less expensive embodiment of the electro-hydraulic vertical height adjustment means is depicted in FIG. 3c. It is a manually operated air over hydraulic unit. In this variant the pump and reservoir are replaced with a squeeze bulb similar to that used for blood pressure cuffs or automotive lumbar seat back adjustments. Allowing air into the bulb item (57) is an air inlet check valve item (60), and when squeezed air passes out of the bulb, past the discharge check valve item (59), which prevents air from returning to the bulb. Squeezing the bulb forces air through the air line into a dual air/hydraulic cylinder item (58). This cylinder has an expandable air chamber item (58a), which applies air pressure on to hydraulic fluid in the hydraulic fluid chamber item (58b) of the combined air/hydraulic cylinder item (58). A like pressure passes through the line to the seat post cylinder item (19a) causing the seat post ram to move in the seat post cylinder, raising the seat. When the thumb screw relief valve item (61) is opened, air pressure is released, relieving hydraulic pressure, allowing the seat ram item (21a) to retract into its cylinder item (19a), lowering the seat.

The concept, with its ability to move sideways and raise and lower the seat, remains unique.

As depicted the chair utilizing the stressed seat post item (19) as a component of the frame assembly combined with mono leaf springs item (25) seem to be the most economical in both its development and manufacturer, however as final development and production occurs some of these other embodiments may become more applicable. As such this application should not be limited to the specification depicted.

Other embodiments possible would combine the various frame styles with the various vertical adjustment means and various horizontal tilt means and multiple electro-mechanical directionally pivoting propulsion means such as depicted in FIG. 9. Again, the possible combinations seem endless, but the ability of sideways movement and automatic seat adjustment remain unique to the invention of this application.

For example, another embodiment of the device utilizes the sideways drive units combined with what is commonly referred to as a posture chair FIG. 8. This device would still have the backless seating and the kneeling position of a typical posture chair, but incorporate the sideways movement capabilities of the self powered variable direction wheeled task chair.

The embodiments of the invention in which an exclusive property or privilege is claimed are as follows:

1. A power driven wheel chair comprising:
   a seat post frame member, having at least a lower attachment point, an upper attachment point for a driven gear retainer, and an attachment point for a vertical adjustment motor,
   a longitudinal leaf spring element, having at least a forward mounting point, a rearward mounting point and a center point for attachment to the lower attachment point of the seat post frame member,
   a pair of diagonal leaf spring elements, each having a first and second end, and a center point for attachment to the lower attachment point of the seat post frame member, first and second pairs of stabilizing castors, one castor being mounted at each end of each diagonal leaf spring element, wherein each diagonal leaf spring element is attached at its centerpoint to the seat post frame member, the diagonal springs forming an X-shape as viewed from above, each diagonal leaf spring element centerpoint coincident with the longitudinal leaf spring element centerpoint, the chair further comprising at least single front and rear electro-mechanical directionally pivoting propulsion units, each unit having at least a single ground-engaging drive wheel, each further being attached to the respective forward and rearward mounting points of the longitudinal leaf spring element, the chair further comprising an electro-mechanical means for adjusting a vertical height of a seating, footresting and armresting means, the vertical height adjusting means comprising a vertical adjuster screw that has a top mounting point for attaching said seating, footresting and armresting means, the screw fitting into said seat post frame member, the chair further comprising an electro-mechanical means for adjusting a horizontal tilt of said seating, footresting and armresting means, the horizontal tilt adjusting means attached between the top mounting point of the vertical adjusting screw and a lower mounting point of said seating, footresting and armresting means, said seating, footresting and armresting means having a pair of armrests, one each attached to each side of said seating, footresting and armresting means so as to provide the operator with a left and a right armrest, said seating, footresting and armresting means further comprising a control panel, attached to the right or left armrest, said control panel comprising:

a joy stick controlling said front and rear electro-mechanical directionally pivoting propulsion units;

a mode button controlling first, second and third steering modes;

a vertical height switch controlling at least a single vertical height adjustment motor;

a power selector switch controlling a battery operation mode or a directconnected, alternating current operation mode; and a park and emergency stop button controlling a park and emergency stop mode, the chair further comprising boxes attached to the chair that contain at least a single on-board battery and at least a single on-board control circuit.

2. The chair of claim 1 wherein each front and rear electro-mechanical directionally pivoting propulsion unit comprises:

a fixed frame (3) for attachment to either the forward mounting point or the rearward mounting point of said longitudinal leaf spring frame element, wherein said fixed frame has a mounting point for attaching a mounting bracket (45), for at least a single park and emergency stop solenoid, said fixed frame further having an arm that extends upward from said fixed frame that provides a mounting for said directional motor (1), wherein said upward extending arm of said fixed frame has horizontal receiving arms for an attachment point for mounting at least one double contact brush holder with at least two drive power contact brushes (6), which pass current for propulsion to at least a single set of drive power contact rings (7), fixed substantially around the top of and attached to the housing of at least a single drive motor (5), and, wherein said directional motor has a directional gear set (2) comprising a drive gear and a driven gear with said drive gear mounted on an output shaft of said directional motor with said drie gear in contact with said driven gear, and, wherein said driven gear of said directional gear set is mounted to the housing of said drive motor, and, said fixed frame further comprising a recess for at least a single side bearing (8) arranged to fit between the housing of said drive motor and said recess of said fixed frame so as to allow rotation of said drive motor about a substantially vertical axis, and, wherein said drive motor extends downward through said recess in said fixed frame and is in contact with said side beading mounted in said recess of said fixed frame, and, said fixed frame further comprising a load bearing surface provided on the lower surface of said fixed frame for at least a single load bearing (9), and, wherein said load bearing is positioned between said lower portion of said fixed frame and at least a single pivot frame (4) with said load bearing arranged to allow rotation of said pivot frame about a substantially vertical axis, and, wherein said housing of said drive motor extends downward below said fixed frame and through said side bearing and through said load bearing and has attached to a lower portion of said drive motor housing said pivot frame, arranged so as to pivot with said drive motor as said housing of said drive motor rotates to provide for steering the chair, and, said pivot frame further comprising downward extending arms, wherein at least a single axle (11), is mounted in at least a single axle bearing (11a), mounted in the downward extending arms of said pivot frame, and, wherein said drive motor has an output shaft which extends downward past the housing of said drive motor and past said pivot frame and has attached to it a drive gear which contacts a driven gear that combine to complete the drive gear set (10), with said driven gear of said drive gear set being fixed to said axle, and, wherein said axle has in contact with the axle surface a roller clutch (12), which is fastened to at least a single ground engaging drive wheel (13), said roller clutch allowing a freewheeling between said axle and said ground engagement drive wheel during directional turning of said drive motor housing with said pivot frame attached, and, wherein said roller clutch engages and becomes fixed to said axle when drive power is applied from said drive motor, said roller clutch then transmitting torque to said ground engaging drive wheel, providing movement of the chair.

3. The chair of claim 1 wherein, said seat post frame member has a recess to receive a driven gear (23) which comprises a bearing surface that extends into said seat post frame recess said gear having internal threads and being held from moving vertically by said driven gear retainer and, wherein said seat post frame member further has an internal channel to allow vertical movement of said vertical adjuster screw (21) with at least a single attachment point at the top for attaching said seating, footresting and armresting means, said vertical adjuster screw further comprising external threads that mesh with the internal threads of said driven gear, and, wherein said seat post frame member further has a vertical slot that receives an anti-turn pin (24) that extends through the lower end of said vertical adjuster screw and prevents said vertical adjuster screw from turning, and, wherein said driven gear engages a drive gear of said vertical adjustment motor and is held in place by said driven gear retainer, forcing said vertical adjuster screw to move up or down as power is applied to said vertical adjustment motor raising or lowering the mounting point at the top of said vertical adjuster screw.

4. The chair of claim 1 wherein said electro-mechanical means for adjusting the horizontal tilt of said seating, footresting and armresting means comprises:

a mounting bracket having at least a raised forward end, a lower rear end, and a center mounting point for attachment to the top of said vertical adjuster screw, wherein said raised forward end comprises a first hinge half, said lower rear end comprises a pivot nut, said tilt adjusting means further comprising a tilt bracket having at least a forward end, a rearward end, and a center point for attachment of said seating, footresting and armresting means, wherein said forward end comprises a second hinge half pivotally connected to said first hinge half, said rearward end comprising a receiver which receives an end of a tilt screw, said mounting bracket having attached, at a rearward side, a tilt motor attachment bracket, said tilt motor attachment bracket having a downwardly extending arm, said downwardly extending arm having a vertical slot therein;

said tilt screw is attached to an output shaft of a tilt motor, said tilt motor having side-mounted pivot pins engaged in said vertical slot, said pins preventing said tilt motor from turning, said tilt motor turning said tilt screw which is threadedly connected to said pivot nut, the turning of said tilt screw raising or lowering said rear end of said tilt bracket.

5. The chair of claim 1 wherein:

said seating, footresting and armresting means comprises:

an operator's seat, said seat having at least a single attachment point for attachment to a center point of at least a single tilt bracket, said seat further comprising a mounting point for a backrest, a mounting point for a footrest, and mounting points for said left and right armrests;

said control panel attached to one of said armrests, with a pivot hinge.

6. The chair of claim 1 wherein, the first steering mode comprises an independent steering mode wherein said front electro-mechanical directionally pivoting propulsion unit is free to pivot for steering and said rear electro-mechanical directionally pivoting propulsion unit is fixed from pivoting and;

wherein the second steering mode comprises a synchronized steering mode wherein both the front and the rear said electro-mechanical directionally pivoting propulsion units are steered in a same direction allowing the chair to move in any direction and;

wherein the third steering mode comprising a chair rotation mode wherein the front and the rear said electro-mechanical directionally pivoting propulsion units being steered in opposite direction so as to be pointed in opposite direction and wherein the rotational directions of said propulsion units ground engaging wheels will thus be in opposite directions causing the chair to rotate about a substantially vertical axis near the center point of said leaf spring frame elements and;

wherein said safety park and emergency stop mode comprises at least a single electro-mechanical park and emergency stop means of fixing the rotation of at least one of the said electro-mechanical directionally pivoting propulsion units ground engaging drive wheels, and, wherein said park and emergency stop button (42e) on said control panel (42) controls at least a single electro-mechanical park and emergency stop means, wherein said electro-mechanical park and emergency stop means comprises a solenoid (46) which attaches to at least a single solenoid mounting bracket (45) which attaches to a fixed frame portion (3) of said electro-mechanical directionally pivoting propulsion unit, and, wherein said solenoid is in contact with at least a single pivot lever (48), and, wherein said pivot lever comprises a first end and a second end and a pivot point near its middle and is attached with a pivot pin (50) at said pivot point to said mounting bracket (45) of said parking and emergency stop solenoid, and, wherein said first end of said pivot lever has between it and a section of said fixed frame portion, a spring (47) which applies pressure to said lever, said lever pivots at said pivot point due to pressure from said spring allowing said second end of said lever to move toward said ground engaging drive wheel, and, wherein the second end of said lever has an attachment point for attaching at least a single friction material (49), with a friction material attachment pin (51) and when said pivot lever pivots toward said ground engaging drive wheel, said friction material is moved into contact with said ground engaging drive wheel so as to fix it in place and prevent rotation of said ground engaging drive wheel, stopping or holding the chair from moving.

* * * * *